Patented June 22, 1926.

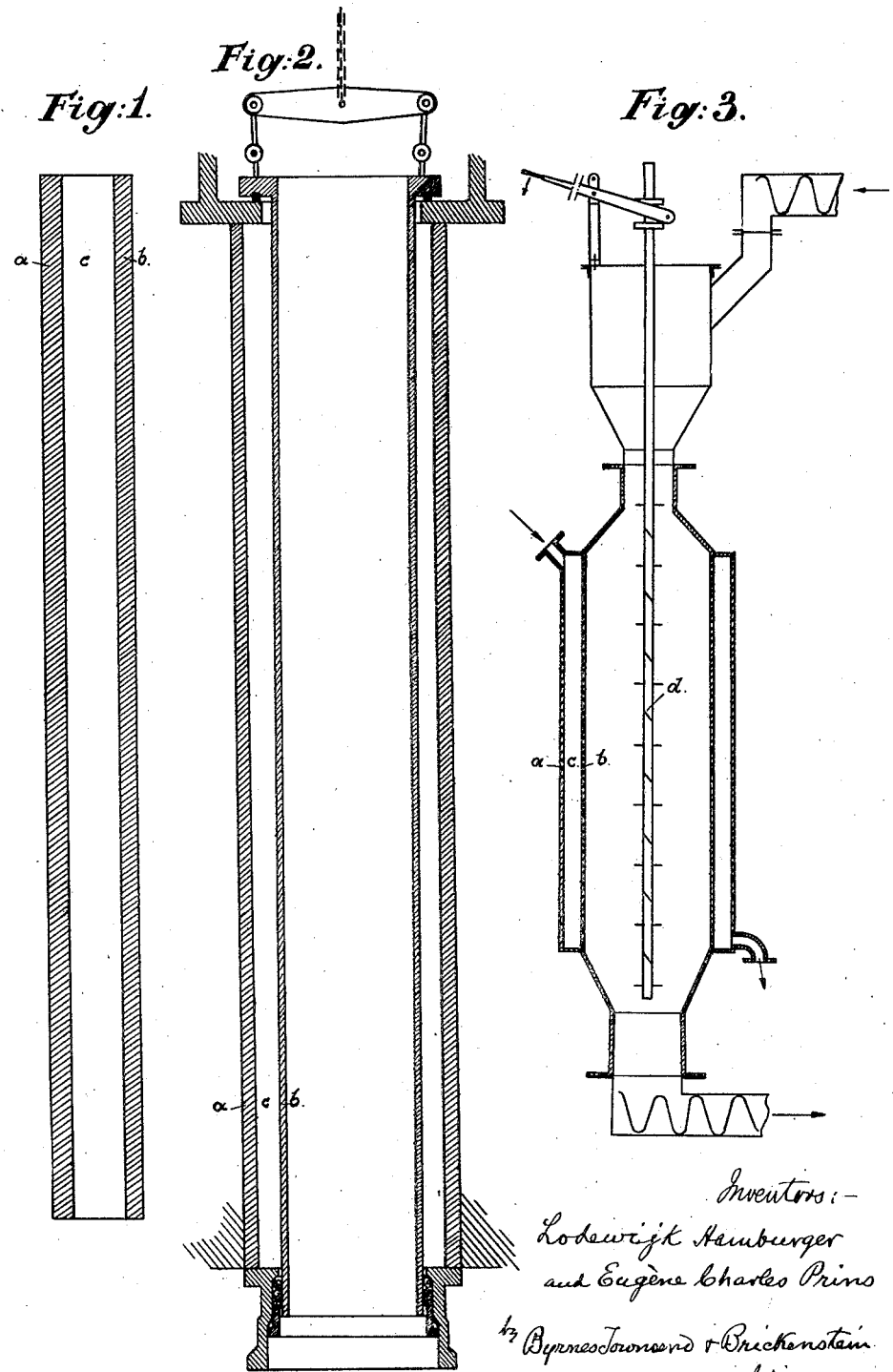

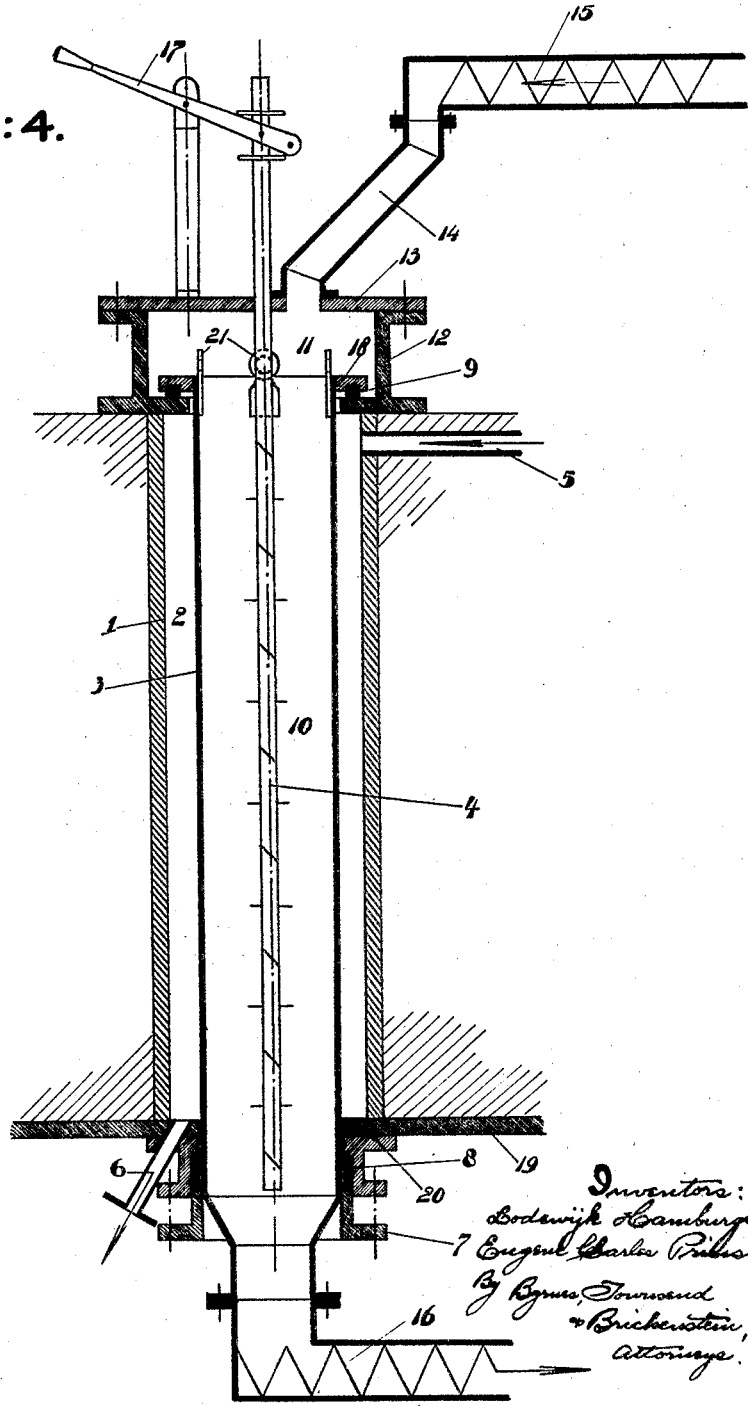

1,590,161

UNITED STATES PATENT OFFICE.

LODEWIJK HAMBURGER AND EUGÈNE CHARLES PRINS, OF DORDRECHT, NETHER-
LANDS, ASSIGNORS TO NAAMLOOZE VENNOOTSCHAP STIKSTOFBINDINGSINDUS-
TRIE " NEDERLAND," OF DORDRECHT, NETHERLANDS.

FURNACE FOR CHEMICAL REACTIONS.

Application filed February 15, 1924, Serial No. 693,121, and in Netherlands March 13, 1923.

Among the furnaces for reactions of various kinds in which one or more gases take part are the well known blast furnaces and the retort and chamber furnaces used in town gas plants and coke oven plants. The blast furnaces as well as water gas generators belong to the type with so called internal combustion—in which the required heat is obtained by burning part of the charge in the reaction chamber—the second type belongs to the furnaces with so called external heating in which the walls of the reaction chamber transmit the heat from the exterior to the contents of the furnace. The latter type of furnace with exterior heating is especially important for such high temperature reactions which—because of the chemical reactions—would be disturbed by internal combustion.

Though the improvements hereafter described are partly important for furnaces with internal heating they principally relate to the type of furnace with external heating. The existing furnaces of this type have several drawbacks. For instance the walls of the reaction chamber are usually thick in order to insure sufficient impermeability for gases at high temperature, as well as the mechanical strength, which is required when the product of the reaction is discharged from the reaction chamber with considerable force and is replaced by a charge of coarse, hard and cold fresh material; this requirement of mechanical resistance is still more important when the walls of the chambers or retorts must be repaired after some time. It is clear, that considered from the standpoint of heat economy, such thick walls must be considered as a great drawback. Moreover the constructions of such furnaces for reactions in an alkaline medium in which one or more gases take part is a problem not practically solved. Evidently materials such a chamotte, silica, quartz and the like cannot be used, because of their acid character, and retorts with walls of alkaline character, such as dolomite or magnesite, have not come into use. This is partly due to the high price of the latter materials but more especially to their porosity and other properties so that they are not suitable for chemical reactions in which liquids (molten masses) or gases are originally present or are added or are generated in the course of the process.

It has been proposed to make retorts with walls of nichrome but this proposal only shows how much a solution of the problem in question is needed. In the first place, retorts of cast nichrome would be about 300 times as costly as retorts of chamotte, but besides this they have the important practical drawbacks of being unstable when heated under reducing conditions and of being attacked by alkaline oxidizing media. A further drawback is the porosity of the cast nichrome as manufactured at the present time.

The present invention relates to a furnace for chemical reactions, particularly for reactions of the kind hereinafter referred to which necessitates a high temperature such as a temperature above 800° C. and higher. According to the invention the furnace has a reaction chamber with walls consisting of at least three layers wherein the outer layer is relatively thin and composed of a highly refractory material such a chamotte, dolomite, magnesite or the like and is preferably seamless, while one at least of the other layers consists of a liquid or solid metallic substance protected from oxidation by a reducing agent. This protection may be effected by carbon in combined or dissolved or free state or by reducing gases.

It is evident that a seamless wall is desirable to prevent unnecessary loss of reducing gases, molten metal, etc. by leakage. When, for technical reasons, chamber or retort walls must be used, consisting of more than one piece, it will be desirable to reduce the number of seams as much as possible and to prevent the possibility of leakage by using sleeve joints and the like.

The invention is illustrated but not limited by the accompanying drawing.

In the drawing Fig. 1 shows a diagrammatic section of an oven wall.

Fig. 2 shows a section of a cylindrical retort; and

Figs. 3 and 4 are vertical sections illustrating other embodiments of the invention.

When a liquid metallic wall is used besides the exterior refractory wall $a$, it is advantageous to use another refractory inner wall $b$, so that the liquid metal $c$ is enclosed between the refractory walls as shown diagrammatically in Fig. 1. Preferably a metal bath is chosen which has a low vapour pressure even at high temperature, such as aluminium, tin, lead, etc., or a metal alloy. When small pieces of carbon have been introduced into the space between the two walls the molten metal may be introduced from an elevated tank by making use of the principle of communicating vessels and letting it rise in the intermediate space.

When a solid inner metal wall is used, such as a wall of nickel, copper or iron, it is also possible to use a liquid metallic phase between the solid metal wall and the wall of highly refractory material in order to obtain efficient heat transmission.

In another form of the invention a small space is left between a solid metal inner wall and a highly refractory outer wall which is filled with a finely divided reducing agent, such as carbonaceous material and the like. Instead of this in some cases reducing gases may advantageously be passed through said space.

Fig. 2 shows a very simple example. Herein is $a$ a seamless cylindrical retort of highly refractory material with a round inner tube $b$ around which is an annular space $c$. In case finely divided carbon or carbon dissolved in molten metals is used the bottom may, if desired, be provided with means to remove the carbonaceous material from $c$ when this has lost a large part of its carbon. In such case care should be taken to replace it at the top of the reaction chamber by a material containing more carbon. A similar apparatus may be used when powdered carbon is used as a filling material in the annular space $c$. In some cases it may be advisable when using liquid metals to use a device to cause the molten metal to circulate through a separate heating and carbonizing zone (to take up carbon).

In the apparatus described the capacity of resisting mechanical stresses and variations of temperature, such as may be caused by discharging and charging with cold material, and the impermeability to gases are assured by the inner wall. This not only enables the highly refractory outer wall to be made very thin, but also causes this outer wall to be subjected to only such small variations of temperature, that a long life is insured.

It is evident that the use of thin walled tubes or chambers of highly refractory material is only possible when the material is not subjected to heavy stresses, and precaution should be taken, that owing to differences in expansion of the wall of the furnace and of the wall of the retort or chamber, the chamber or retort of vertical furnaces should not be disrupted, with the result that the protecting molten metal or layer of carbon or reducing gases would escape. For this reason it is important to provide for a free expansion of the wall of the reaction chamber, for instance by building it on the telescopic principle. To this purpose it may consist of two or more parts each fixed at one place and overlapping each other to a certain extent in such manner that the different parts may slide somewhat over each other. This avoids all longitudinal stress and necessitates only a transverse overlapping seam which remains substantially tight. Instead of or together with using a telescopic construction a suitable construction of the end pieces of one or more layers of the walls may be used which provides for a free expansion, such as a system of packing glands (as shown in Fig. 2) or pressure bolts and it is also contemplated to use materials for the furnace wall and the thin highly refractory wall of the reaction chamber having substantially the same coefficient of expansion.

The use of metal retorts at high temperature in the manner described is especially important for reactions in alkaline media. For such purpose even iron may be used.

When using solid metal inner walls consideration should be given to possible faults or corrosion which in course of time will make it necessary to renew the reaction chamber.

Fig. 2 shows a construction with a cylindrical reaction chamber and which also enables the internal metal retort to be lifted out of the protecting tube.

It is further evident that variations in temperature are reduced to a minimum by the use of furnaces in which the chemical and thermal conditions in the reaction chamber are maintained constant by continually charging and discharging the reacting substances in constant proportion. Such a type of furnace with a molten metal as intermediate wall in a three layer wall of the reaction chamber is diagrammatically shown in Fig. 3. By using a molten metal as intermediate wall the temperature may be considerably raised without fear of deterioration of the reaction chamber. It is further remarked that the high heat conductivity of the metal bath strongly favors the establishment of a uniform temperature in the reaction chamber both in the vertical and horizontal directions.

Fig. 3 further shows a device $d$ with a slight reciprocating movement which may be effected by mechanical means if desired and which promotes a continuous discharge. A similar device may also be used in discontinuous types of furnace.

As shown in Fig. 4. the furnace wall comprises a thin outer seamless wall 1 of chamotte or the like, an inner iron wall 3, and an intermediate wall consisting of a molten metallic substance containing dissolved and powdered carbon. The interior 10 of the retort is in free communication with a chamber 11 at its upper end. The chamber 11 is formed by a piece 12, comprising the side walls and bottom flange through which the wall 3 extends and a coverlid 13 through which passes a central stirring device 4 and which is connected to the chute 14 to which the charge for the furnace is delivered by the conveyor 15. When the furnace is working, material is continually charged by the conveyor 15 and the chute 14 through the chamber 11 to the interior 10 of the retort and continually discharged therefrom by a conveyor 16 connected to the part of the inner wall 3 which extends below the rest of the furnace.

The stirring device 4 is actioned by a rod 17 which obtains a reciprocal movement by any suitable mechanical device (not shown).

The wall 3 has a flange 18 which is secured to the bottom flange of the piece 12, a packing 9 making a tight joint. The lower end of wall 3 extends through a plate 19 by which the walls 1 and 2 are supported. Secured to this plate 19 is a stuffing box 20 through which the wall 3 passes. A gland 7 and packing 8 secure a free expansion of wall 3 with respect to the other layers of the wall of the furnace.

The intermediate wall 2 is connected at its upper end with a tube 5 and at its lower end with a tube 6. At 5 a molten metal, containing dissolved and powdered carbon, is continually fed into wall 2 and it is discharged by tube 6. The discharged metal is mixed with fresh carbon and returned to tube 5 by any suitable device (not shown).

The iron wall 3 may be removed from the furnace. To this purpose the metal in 2 is discharged and the coverlid 13, the stirrer 4, the chute 14 and the rod 17 are disconnected and removed.

The joints between wall 3 and conveyor 16 and between flange 18 and bottom piece 12 are also disconnected and then the wall 3 can be lifted up with the aid of the ears 21 provided at its top, to remove it and eventually replace it by a similar wall.

It is an important advantage that the construction may be so simple that a quantitative recovery of all gases produced by the chemical reactions in the retort can always be insured, which is in many cases of special commercial or hygienic importance.

The furnace according to the invention is especially suitable for all purposes in which a quick transport of heat between an external heating agent and the contents of the retort is important. This is the case for instance in processes for fixing nitrogen and in particular in processes for the manufacture of cyanides by heating alkali metal or alkaline earth metal carbonates or oxides with carbon in an atmosphere of nitrogen with or without the presence of a catalyst such as iron.

What we claim is:

1. A furnace for chemical reactions, particularly for reactions which necessitate a high temperature, having a reaction chamber with walls consisting of at least three layers wherein the outer layer is relatively thin and composed of a highly refractory material, while one at least of the other layers consists of a substance in contact with a reducing agent.

2. A furnace according to claim 1 in which the outer layer is seamless.

3. A furnace for chemical reactions particcally for reaction which necessitate a high temperature, having a reaction chamber with walls consisting of at least three layers wherein the outer layer is relatively thin and composed of a highly refractory material and one at least of the other layers is in contact with a reducing agent, and means permitting a free expansion of the different layers of the wall of the reaction chamber with respect to each other.

4. A furnace for chemical reactions, particularly for reactions which necessitate a high temperature, having a reaction chamber with walls consisting of at least three layers wherein the outer layer is relatively thin and composed of a highly refractory material and an intermediate layer consisting of a substance containing a reducing agent, and means for regularly charging and discharging this intermediate layer.

5. A furnace for chemical reactions, particularly for reactions which necessitate a high temperature, having a reaction chamber with walls consisting of at least three layers wherein the outer layer is relatively thin and composed of a highly refractory material, and one at least of the other layers consists of a substance in contact with a reducing agent having a mechanically moved central mechanism to promote continuous discharge of the reaction products.

6. A furnace for chemical reactions, particularly for reactions which necessitate a high temperature, having a reaction chamber with walls consisting of at least three layers wherein the outer layer is relatively thin and composed of a highly refractory material and one at least of the other layers consists of a substance in contact with a reducing agent, while means are provided for continually circulating an intermediate liquid reducing agent through a space in the wall.

7. A furnace for chemical reactions, particularly for reactions which necessitate a high temperature, having a reaction chamber with walls consisting of at least three layers wherein the outer layer is relatively thin and composed of a highly refractory material, the innermost layer is composed of a solid metal and one intermediate layer contains carbon as a reducing agent.

8. A furnace for chemical reactions, particularly for reactions which necessitate a high temperature, having a reaction chamber with walls consisting of at least three layers wherein the outer layer is relatively thin and composed of a highly refractory material, while one at least of the other layers consists of a reducing agent, and the innermost layer is composed of a removable solid iron wall.

9. A furnace according to claim 8 in which the layer adjoining the innermost solid iron layer consists of a molten metallic substance containing dissolved carbon.

10. A furnace for chemical reactions, particularly for reactions which necessitate a high temperature, having a reaction chamber with walls consisting of at least three layers wherein the outer layer is relatively thin and composed of chamotte, the innermost layer of iron and the intermediate layer of a molten metallic substance together with powdered carbon.

In testimony whereof we affix our signatures.

LODEWIJK HAMBURGER.
EUGÈNE CHARLES PRINS.